Dec. 25, 1951            W. W. KRAFT            2,579,501
SEPARATION OF WAX BY FILTRATION
WITH FLUE GAS CHILLING
Filed July 14, 1949
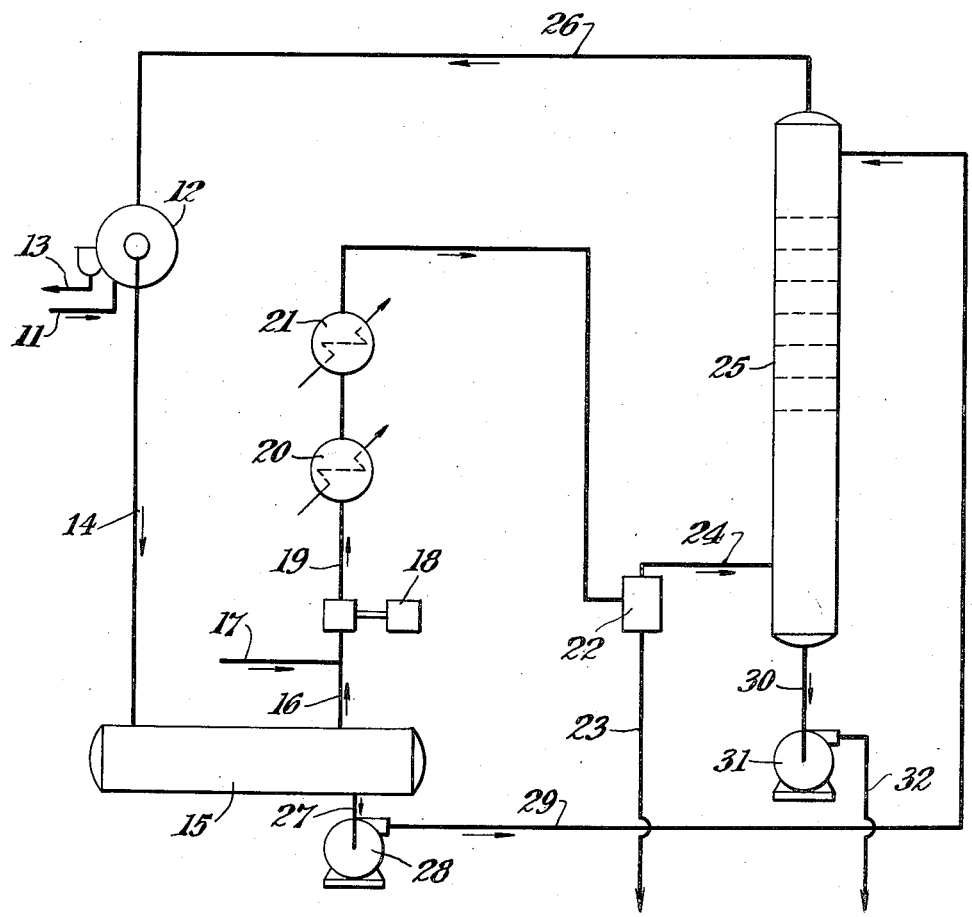
INVENTOR.
*Wheaton W. Kraft*
BY
*Nathaniel Ely*
ATTORNEY Patented Dec. 25, 1951

2,579,501

UNITED STATES PATENT OFFICE 2,579,501

SEPARATION OF WAX BY FILTRATION WITH FLUE GAS CHILLING

Wheaton W. Kraft, Scarsdale, N. Y., assignor to The Lummus Company, New York, N. Y., a corporation of Delaware Application July 14, 1949, Serial No. 104,629

10 Claims. (Cl. 196—19)

1

This invention relates generally to continuous filtration and more particularly to an improved method for cooling the gases which are employed in solvent dewaxing filter operations.

It is generally known that the presence of an inert cold gaseous atmosphere in the filter is advantageous and in present practice, the chilled gas is continuously used and recycled. However it picks up moisture and since it must be used at temperatures of the order of 32° F. or less, ice formation has become a serious problem.

In accordance with my invention, I avoid the use of the usual shell and tube heat exchangers heretofore employed in the low temperature stage of cooling and thereby avoid many of the operating difficulties which were generally observed. More particularly, my invention relates to the use of very large quantities of solvent with respect to the amount of gas handled, and by using a direct contact tower, the amount of ice formed and carried away in the liquid is so small as to not materially reduce operating efficiency nor to increase operating costs.

I have now found, an economical method for avoiding the difficulties inherent in the chilling of flue gases. This is done by subjecting flue gases to preliminary cooling in an indirect heat exchange system to a temperature not lower than the ice point, and then further cooling these flue gases to the required temperature by direct heat exchange in a contacting operation. In this contacting operation, flue gas may be cooled by means of a filtrate from which gas has been separated.

In order to better understand the invention, reference will now be made to the accompanying flow diagram forming a part of this specification, which illustrates a preferred embodiment of my invention.

In carrying out the invention, the wax-bearing oil is advantageously mixed with a solvent liquid or wax precipitating medium. This solvent liquid may comprise a light petroleum fraction such as naphtha or other various organic liquids or mixtures thereof, including alcohols, ketones, aldehydes, cyclic hydrocarbons, benzol or its homologs, or derivatives of these various materials. It is found desirable to use this process for instance when a solvent such as acetone and benzol or methyl ethyl ketone, benzol, and toluol are employed for dewaxing.

The mixture of oil to be dewaxed and the solvent liquid, cooled to proper filtration temperature, is conducted through line 11 into filter 12. Filter 12 is provided with suitable insulating means to maintain the mixture in a chilled condition. This filter is advantageously of the continuous rotating drum type which is generally well known in the dewaxing art.

During operation of the filter, a rotating internal surface, not shown, passes through the body of a filtering mixture maintained in the filter and then emerges therefrom during passage to the upper portion of the filter.

Precipitated wax is deposited on the exterior submerged portion of the rotating surface to form a filter cake, while the solvent and dissolved oil are forced through the filter surface into the interior of the drum. The liquid filtrate within the interior of the drum is withdrawn therefrom through suitable means including line 14 and passed into filtrate tank 15. The tank 15 is maintained under a reduced pressure by means of a vacuum exerted through a vacuum pump 18, communicating with the top of the tank through line 16.

In the filtering operation occurring in filter 12, the separated wax may be vacuum dried and then washed by means of a spray of suitable washing liquid which is drawn through the cake into the interior of the drum. This washing liquid is customarily withdrawn from the filter 12 by independent means not shown, but it may be combined with the filtrate and removed through line 14 if desired. Vacuum pump 18 also communicates with filter 12 through tank 15 and line 14 and creates a vacuum within the filter 12. This vacuum, applied to the filter cake after washing, permits drying the cake and maintaining it in a cold condition by drawing cold gas therethrough. Separated wax is removed from filter 12 by suitable means not shown, through line 13.

Filtrate from filter 12 passing through line 14 into filtrate tank 15 will contain flue gas which is mechanically entrained in the filtrate. Tank 15 is maintained at a lower pressure than filter 12 and accordingly, flue gas contained in the filtrate will be separated from the filtrate in the tank. While the vacuum pump 18 is shown as taking direct suction from tank 15, it may be desirable to interpose suitable traps to remove foreign matter.

In normal operation, it is necessary to provide a source of make-up gas to replace any gas which may be inadvertently lost or purposely withdrawn from the system. Make-up gas is introduced through line 17 into line 16 and then into vacuum pump 18.

The exhaust gases from the vacuum pump 18 are conducted through line 19 to water cooler 20 and chiller 21. The liquid condensed from the chilled gases is separated in trap 22, which may be any type of liquid-gas separator, and is drawn off through line 23. The gas, now cooled to a temperature slightly above 32° F., passes from trap 22 through line 24 into the lower part of contact tower 25. Tower 25 may be any type of contact tower. It may be packed with a suitable packing material or it may contain shower trays or bubble decks.

Filtrate, from which gas has been separated, is drawn off from tank 15 through line 27, pump 28, and line 29 to the upper part of the contact tower 25. Pump 28 is a low head pump. It will be noted that the filtrate entering the tower 25 will be at approximately the same temperature as that in filter 12. In contact tower 25, flue gas will be dried and cooled to the filtering temperature. This cooled flue gas is withdrawn from the overhead to line 26 through which it is passed to filter 12. The pressure in tower 25 is sufficiently great so that the cooled gases may be passed directly to filter 12 without additional pumping. Proper lines and valves, not shown, may be supplied at this point or elsewhere to allow for drawing off any desired amount of cooled and dried flue gas from the system.

Proper by-pass lines and control valves, not shown, may be used to by-pass part of the filtrate around contact tower 25 if further control of the contacting operation is desired. Filtrate is removed from the bottom of tower 25 through line 30, pump 31, and line 32. Pump 31 is a high head pump. Filtrate removed through line 32 is passed into a double pipe recovery system in which it cools the incoming solution in line 11 from about 100° to 40° F.

This novel system for cooling flue gas has substantially the same power requirements as previous processes. Low head pump 28 has a very low power consumption and high head pump 31 is substantially the equivalent of that employed by the prior art to pump filtrate back to the double pipe exchangers. Since much smaller amounts of heat exchanger surfaces are required, a greater overall economy may thus be obtained.

In one system designed for operation according to this invention, a cold mixture of wax, oil, and solvent at —10° F. is fed into the filter 12 through line 11. Wax is removed through line 13 and approximately 200,000 pounds per hour of filtrate are passed through line 14 to tank 15. Whereas filter 12 operates at a pressure slightly less than 6 pounds per square inch gauge, the tank 15 is at a pressure of about 2 pounds per square inch absolute. Due to this difference in pressure, gas is separated from the liquid as it enters tank 15.

This recycle gas is withdrawn from tank 15 through line 16 and make-up gas which may be warm and may contain water is introduced through line 17 into line 16. The combined gases amounting to about 7800 pounds per hour along with entrained solvents and water are passed to vacuum pump 18. The gases are then cooled and chilled in cooler 20 and chiller 21 to about 40° F. After the condensed liquids are removed in gas-liquid separator 22 and through line 23, the gas is led into the bottom of tower 25.

Liquid is withdrawn from tank 15 at a temperature of about —10° F. This is pumped to the top of tower 25. It has been found most desirable to hold the ratio of liquid to gas in tower 25 greater than 10 to 1 by weight, preferably about 25 to 1.

In the tower 25 the descending stream of cold liquid is heated from about —10° F. to —8° F. by the ascending stream of gases. The increase in temperature of liquid passing through tower 25 will always be less than 5° F. and under most favorable conditions will be about 2° F. This small temperature difference can readily be absorbed in the subsequent heat exchange operation and accordingly it does not detract from the advantageous features of this invention. The gases in turn are cooled from about 40° F. to —10° F. and simultaneously dried. The water, in the form of ice, transferred to the filtrate liquid amounts to about 13 pounds per hour for the 200,000 pounds per hour of filtrate.

These conditions may be modified to meet the specifications and requirements for any particular operation.

The gas has been herein referred to for convenience as flue gas. It is apparent, however, that it may include hydrocarbon vapor, fixed gases such as nitrogen, or other appropriate constituents.

While a vacuum type of continuous filter is generally employed, it is contemplated that this invention is equally well adapted to filtration under super-atmospheric pressure. The pressure in the contact tower will always be greater than the pressure in the filter, in order to pass dried gas to the filter without the use of an additional pump.

This invention is not limited to the filteration of wax from wax-bearing oils, but is adapted to filtering other types of solid materials from liquids wherein it is desirable to maintain the resulting cake of solids at a temperature below that at which the solids tend to liquefy.

Obviously many modifications and variations of the invention as hereinbefore set forth, may be made without departing from the spirit and scope thereof, and therefore only such limitations should be imposed as are indicated in the appended claims.

I claim:

1. In a continuous process for separation of wax from a chilled mixture of wax, oil and solvent by filtration of said mixture in an atmosphere of flue gas to produce a separated wax and a filtrate containing said flue gas, the improvement which comprises withdrawing from the filtration operation filtrate containing said flue gas, passing said withdrawn filtrate to a gas-liquid separating operation thereby separating flue gas contained in the filtrate and producing a denuded filtrate, introducing make-up gas to said separated flue gas, cooling the combined make-up gas and flue gas to condense liquid therefrom, separating the condensed liquids from said combined gas, removing liquid from said gas-liquid separating operation, contacting said combined gas with said denuded filtrate, thereby further cooling the gas to the filtration temperature and simultaneously scrubbing the combined gas, and passing said cooled and scrubbed gas to the filtration operation.

2. In the process of claim 1 the improvements claimed therein where the combined make-up gas and flue gas is cooled to a temperature exceeding 32° F. in the first cooling step.

3. In the process of claim 1 the improvements claimed therein where the pressure in the contacting operation is greater than the pressure in the filtration operation.

4. In the process of claim 1, the improvements claimed therein where the temperature of the denuded filtrate leaving the contacting operation is below the ice point.

5. In the process of claim 1, the improvements claimed therein where the amount of water in the denuded filtrate leaving the contacting operation is substantially below the quality required for saturation.

6. In a continuous process for separation of wax from a chilled mixture of wax, oil and solvent by filtration of said mixture at a temperature less than 0° F. in an atmosphere of flue gas to produce a separated wax and a filtrate containing said flue gas, the improvement which comprises withdrawing from the filtration operation filtrate containing said flue gas, passing said withdrawn filtrate to a gas-liquid separating operation thereby separating fluid gas contained in the filtrate and producing a denuded filtrate, introducing warmer make-up gas to said separated flue gas, cooling the combined make-up gas and flue gas to a temperature exceeding 32° F. to condense liquid therefrom, separating the condensed liquids from said combined gas, removing liquid from said gas-liquid separating operation, contacting said combined gas with said denuded filtrate at a pressure greater than the filtration pressure, thereby further cooling the gas to the filtration temperature of less than 0° F. and simultaneously scrubbing the combined gas, and passing said cooled and scrubbed gas to the filtration operation.

7. The process of claim 6 and the improvements claimed therein where the temperature rise of the denuded filtrate during the contacting operation is not more than 5° F.

8. The process of claim 6 and the improvements claimed therein where the ratio of liquid to gas in the contacting operation is maintained at least 10 to 1 by weight.

9. In a continuous process for separation of wax from a chilled mixture of wax, oil, and solvent by filtration of said mixture at approximately −10° F. in an atmosphere of flue gas to produce a separated wax and a filtrate containing said flue gas, the improvement which comprises withdrawing from the filtration operation filtrate containing said flue gas, passing said withdrawn filtrate to a gas-liquid separating operation thereby separating flue gas contained in the filtrate and producing a denuded filtrate, introducing make-up gas to said separated flue gas, cooling the combined make-up gas and flue gas to approximately 40° F. to condense liquid therefrom, separating the condensed liquids from said combined gas, removing liquid from said gas-liquid separating operation, contacting said combined gas with said denuded filtrate at a pressure greater than the filtration pressure, thereby further cooling the gas to the filtration temperature of approximately −10° F. and simultaneously scrubbing the combined gas, and passing said cooled and scrubbed gas to the filtration operation.

10. The process of claim 9 and the improvements claimed therein where the filtrate comprises dewaxed oil and a solvent selected from the class consisting of methyl ethyl ketone, benzol, and toluol and mixtures thereof.

WHEATON W. KRAFT.

REFERENCES CITED

The following references are of record in the file of this patent:

UNITED STATES PATENTS

| Number | Name | Date |
|---|---|---|
| 2,134,331 | Gee | Oct. 25, 1938 |
| 2,337,385 | Gross | Dec. 21, 1943 |
| 2,350,944 | Thornton | June 6, 1944 |
| 2,358,921 | Gee | Sept. 26, 1944 |